US008291383B1

(12) United States Patent
Evans

(10) Patent No.: US 8,291,383 B1
(45) Date of Patent: Oct. 16, 2012

(54) CODE ANALYSIS VIA DUAL BRANCH EXPLORATION

(75) Inventor: Christian Lewis Evans, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1031 days.

(21) Appl. No.: 12/254,419

(22) Filed: Oct. 20, 2008

(51) Int. Cl.
*G06F 9/44* (2006.01)
(52) U.S. Cl. ........................................................ 717/124
(58) Field of Classification Search .................. 717/142, 717/124–129; 714/38.1, 38.12–38.14
See application file for complete search history.

(56) References Cited

U.S. PATENT DOCUMENTS

| | | | | | |
|---|---|---|---|---|---|
| 4,914,659 | A | * | 4/1990 | Erickson | 714/38.11 |
| 5,353,419 | A | * | 10/1994 | Touch et al. | 712/235 |
| 5,423,027 | A | * | 6/1995 | Jackson | 714/38.1 |
| 5,724,504 | A | * | 3/1998 | Aharon et al. | 714/33 |
| 6,249,882 | B1 | * | 6/2001 | Testardi | 714/38.14 |
| 6,289,507 | B1 | * | 9/2001 | Tanaka et al. | 717/155 |
| 6,513,154 | B1 | * | 1/2003 | Porterfield | 717/101 |
| 6,760,903 | B1 | * | 7/2004 | Morshed et al. | 717/130 |
| 7,086,033 | B2 | * | 8/2006 | Bates et al. | 717/124 |
| 7,168,009 | B2 | * | 1/2007 | Darringer et al. | 714/38.1 |
| 7,210,124 | B2 | * | 4/2007 | Chan | 717/120 |
| 7,287,243 | B2 | * | 10/2007 | Dollin et al. | 717/126 |
| 7,287,246 | B2 | * | 10/2007 | Tan et al. | 717/129 |
| 7,353,427 | B2 | * | 4/2008 | Bates et al. | 714/38.12 |
| 7,401,322 | B1 | * | 7/2008 | Shagam et al. | 717/128 |
| 7,478,367 | B2 | * | 1/2009 | Morgan et al. | 717/124 |
| 7,644,398 | B2 | * | 1/2010 | Cleaveland et al. | 717/135 |
| 7,734,455 | B1 | * | 6/2010 | Aldrich | 703/6 |
| 7,873,945 | B2 | * | 1/2011 | Musuvathi et al. | 717/124 |
| 7,921,412 | B1 | * | 4/2011 | Laura | 717/127 |
| 2004/0268302 | A1 | * | 12/2004 | Srivastava et al. | 717/108 |
| 2005/0114838 | A1 | * | 5/2005 | Stobie et al. | 717/124 |
| 2006/0150160 | A1 | * | 7/2006 | Taft et al. | 717/126 |

OTHER PUBLICATIONS

"Test-Data Generation Using Genetic Algorithms", Roy P. Pargas et al. Journal of Software Testing, Verification and Reliability. 1999.*
Ghiduk et al., Using Genetic Algorithms to Aid Test-Data Generation for Data-Flow Coverage, 2007 IEEE.*
Pargas et al., "Test-Data Generation Using Genetic Algorithms", Journal of Software Testing, 1999.*

* cited by examiner

*Primary Examiner* — Don Wong
*Assistant Examiner* — Daxin Wu
(74) *Attorney, Agent, or Firm* — Honigman Miller Schwartz and Cohn LLP

(57) ABSTRACT

A method, computer program product, and system are provided to explore branches of a conditional statement in software code. For example, an embodiment of the method includes selecting a first branch of the conditional statement to evaluate, placing a second branch of the conditional statement in a pending branch list, storing checkpoint information on a program state for the conditional statement associated with the second branch, and evaluating the second branch after an evaluation of the first branch. The evaluation of the second branch is based on the checkpoint information. By exploring the first and second branches of the conditional statement (e.g., true and false conditions), wide coverage is possible in the analysis of software code.

29 Claims, 4 Drawing Sheets

Example Software Code 200

```
201 →   char program (char c) {
202 →       c = c + 1;
203 →       if (c >= 10 && c <= 20) {
204 →           return 1;
205 →       } else {
206 →           return 100 / c;
207 →       }
208 →   }
```

Figure 2

CODE ANALYSIS VIA DUAL BRANCH EXPLORATION

BACKGROUND

1. Field

Embodiments of the present invention generally relate to the field of software code analysis. More specifically, embodiments of the present invention refer to a software code analysis tool with wide code coverage.

2. Background

Software testing is an important component of a software quality assurance process. Software faults can occur from a variety of reasons. For instance, a software fault can occur when a programmer makes an error in software source code. In another instance, a software fault can occur due to hardware environment changes such as the software being run on a new hardware platform. It is the task of software developers and quality assurance engineers to find these faults and provide solutions for these defects in a timely manner. As such, to ensure a timely distribution of high-quality software to consumers, software vendors continually seek methods and analysis tools to improve the software development process.

One conventional technique used to find faults in software code is "fuzz" testing. Fuzz testing is a form of black-box testing that provides either random data or otherwise deliberately malformed data to inputs. The results of the fuzz test indicate whether the code fails or crashes as a result of the random inputs. However, the randomness of the inputs used in fuzz testing may yield a large amount of false negative errors. False negative errors refer to a scenario where faults exist in code, but the code analyzer fails to report them. In the case of fuzz testing, the likelihood of catching a subtle boundary-value condition in software code with random inputs is highly unlikely.

Another conventional technique used to find faults in software code is static code analysis. Static code analysis refers to an analysis of code without executing the program. Typically, static code analysis is performed on a version of the software code, where the sophistication of the analysis varies based on the level of modeling by the software developer (e.g., mathematical modeling and interpretation of individual statements and declarations in a section of source code or the entire source code). In addition to generating false negatives, the static code analysis technique may also generate false positive errors. False positive errors refer to a scenario where the code analyzer reports a fault when a fault does not exist.

SUMMARY

Embodiments of the present invention include a computer-implemented method to explore branches of a conditional statement in software code. The computer-implemented method includes selecting a first branch in the software code to evaluate, placing a second branch of the conditional statement in a pending branch list, storing checkpoint information on a program state for the conditional statement associated with the second branch, and evaluating the second branch after an evaluation of the first branch. The method can also include repeating the aforementioned steps for at least a first level of conditional statements in the software code. The evaluation of the second branch is based on the checkpoint information.

With respect to the placing step, an indicator in the pending branch list can be used to track whether a true or false condition of the conditional statement has not been evaluated.

With respect to the storing step, one or more program states evaluated by the software code to reach the conditional statement and one or program states required to trigger the second branch can be tracked. In an embodiment, the checkpoint information can include details on restoration of a program state to a current state, details on a location in the software code to resume an alternate branch of the conditional statement, and details on one or more program state changes that may be required to execute the alternate branch.

With respect to the evaluating step, program misbehavior of the software code can be assessed by monitoring a program failure or a memory access error in a computer system that evaluates the software code. Further, in the evaluating step, the second branch can be removed from the pending branch list once it has been evaluated.

Embodiments of the present invention additionally include a computer program product comprising a computer-usable medium having computer program logic recorded thereon for enabling a processor to explore branches in a conditional statement in software code. The computer program code logic includes the following: a first computer readable program code that enables a processor to select a first branch of the conditional statement in the software code to evaluate; one second computer readable program code that enables a processor to place a second branch of the conditional statement in a pending branch list; a third computer readable program code that enables a processor to store checkpoint information on a program state for the conditional statement associated with the second branch, where the checkpoint information includes at least one of one or more program states evaluated by the software code to reach the conditional statement and one or more program states required to trigger the second branch; and, a fourth computer readable program code that enables a processor to evaluate the second branch, based on the checkpoint information, after an evaluation of the first branch is performed.

Embodiments of the present invention further include a system configured to explore branches in software code. The system includes the following: a selection module configured to select a first branch of the conditional statement to evaluate; a placement module configured to place a second branch of the conditional statement in a pending branch list; a storage module to store checkpoint information on a program state for the conditional statement associated with the second branch, where the checkpoint information includes at least one of one or more program states evaluated by the software code to reach the conditional statement and one or more program states required to trigger the second branch; and, an evaluation branch to evaluate the second branch, based on the checkpoint information, after an evaluation of the first branch is performed.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 2 is an illustration of an example software code used to facilitate in a description of an embodiment of a method to explore branches in software code.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement embodiments of the present invention is not limiting of the present invention. Thus, the operational behavior of embodiments of the present invention will be described with the understanding that modifications and variations of the embodiments are possible, given the level of detail presented herein.

Figure 1:
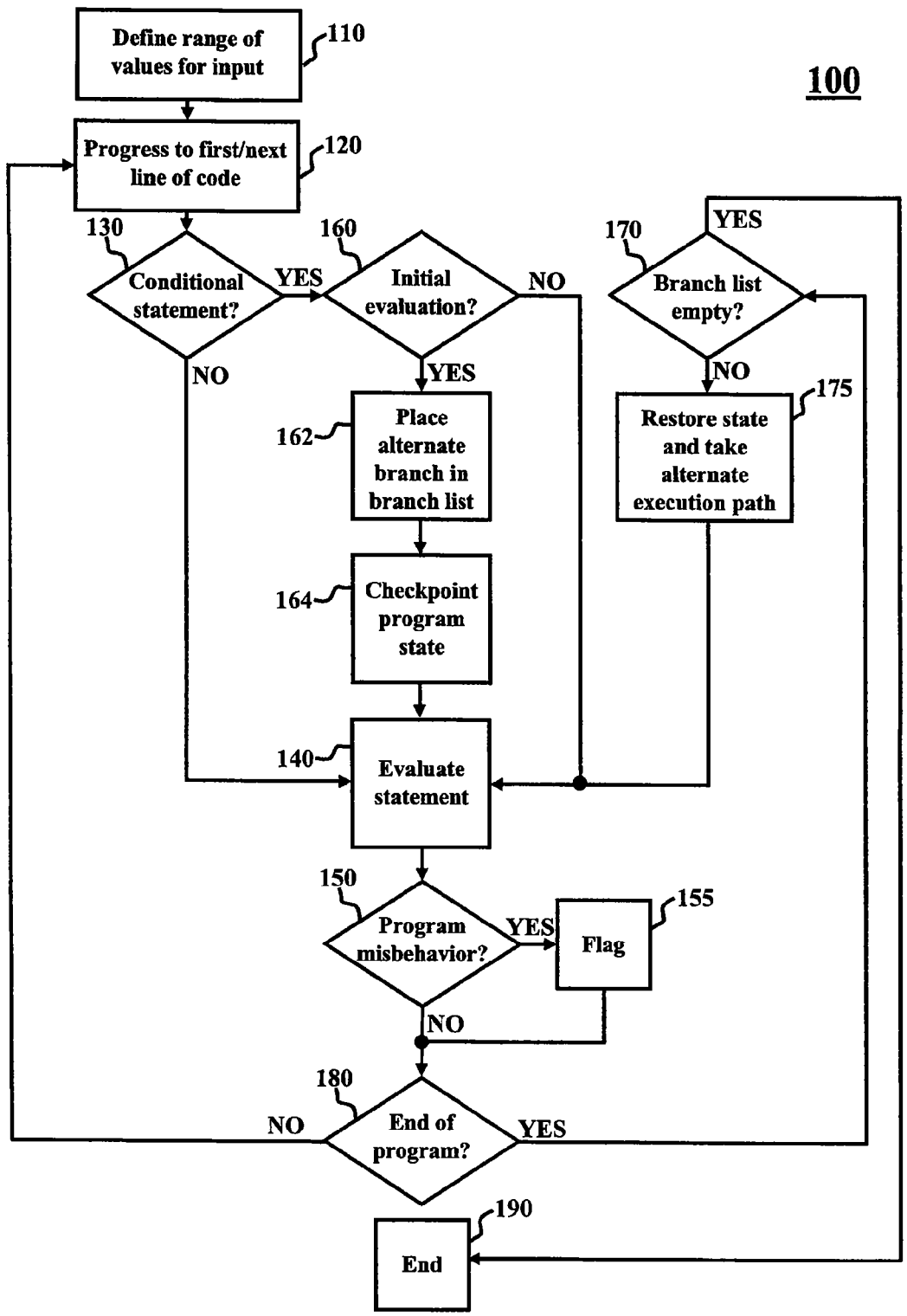
FIG. 1 is an illustration of an embodiment of a method to explore branches of a conditional statement in software code.

FIG. 1 is an illustration of an embodiment of a method 100 to explore branches of a conditional statement in software code. Method 100 generates minimal false positive errors, while also minimizing false negative errors. In an embodiment, method 100 generates zero false positive errors. As a result, method 100 reduces errors in software code.

In fuzz testing, random or deliberately malformed data are used as inputs to a software program and the results of the fuzz test indicate whether the program fails or crashes as a result of the random inputs. Software code often contains conditional statements that can produce multiple results depending on an evaluation of the condition. In analyzing software code with fuzz testing techniques, the code's behavior is explored using random or deliberately malformed inputs and, depending on the inputs, conditional statements branch an execution of the code in a particular direction (e.g., if a condition evaluates as true, then the conditional statement branches the execution of the program to one section of code; otherwise, the conditional statement branches the program to another section of code for execution). Fuzz testing, as a result, may yield false negative errors since all alternatives and combinations of conditional statements are not explored.

Method 100 can evaluate each branch of a conditional statement in software code, thus providing wide code coverage and a reduction in the number of false negative errors. In addition, embodiments of method 100 can elect not to explore branches of conditional statements that have been evaluated and can bypass one or more levels of nested conditional statements so that complexity of the software analysis can be minimized.

Static code analysis models certain portions of code or the entire code, where conditional statements can be represented by mathematical models to reduce complexity and execution time of the analysis. Depending on the sophistication of the mathematical models, the modeling may indicate a possible program state which is in fact not possible. Static code analysis techniques, as a result, may yield false positive errors due to the modeling nature of the analysis tool.

Method 100 generates inputs to software code and evaluates these inputs using the actual code rather than modeling statements and declarations of the program. As a result, method 100 can reduce false positive errors. In an embodiment, method 100 can also eliminate false positive errors.

For ease of explanation, method 100 will be described with reference to example software code. FIG. 2 is an illustration of example software code 200 written in the C programming language. A person skilled in the relevant art will recognize, based on the description herein, that method 100 can be used in a wide variety of software code applications and that these applications can be programmed in other programming languages, such as, for example and without limitation, $C^{++}$ and Java.

In FIG. 2, software code 200 receives a user input and, based on the input, either outputs a '1' or a value equal to '100' divided by the input value. Line 201 is programmed to receive an input 'c' with a data type 'char'. In this example, data type 'char' ranges in value from −128 to 127. In line 202, code 200 increments a value of input 'c' by 1. In line 203, code 200 analyzes a conditional 'if' statement to assess whether 'c' is greater than or equal to '10' and less than or equal to '20' and, if true, code 200 branches to line 204. Line 204 outputs a '1' if the condition in line 203 is true. If the conditional statement in line 203 is false (e.g., 'c' is not between the values of 10 and 20, inclusive), then code 200 branches to the 'else' statement in line 205. The 'else' statement in line 205 executes the statement programmed in line 206, which returns a value of '100/c'.

In referring to method 100 in FIG. 1, step 110 defines a range of values for one or more inputs to the software program. For instance, in referring to exemplary software code 200, line 201 is programmed to receive an input 'c' that is a data type 'char', which has a range of values from −128 to 127. Here, the input values can be one or more values in the range [−128 to 127]. In an embodiment, the input value is a distinct value in the range [−128 to 127]. In the alternative, as a person skilled in the relevant art will recognize, other data types and their respective ranges of values can be used such as, for example and without limitation, 16-bit signed integer (e.g., [−32768 to 32767]), float (e.g., [3.4e−38 to 3.4e+38]), and double (e.g., [1.7e−308 to 1.7e+308]).

Step 120 progresses to the first or next line of the software code. For instance, in exemplary software code 200, line 201 would be the first line of code.

Step 130 assesses whether a statement in the software code is a conditional statement. A conditional statement is a feature of a programming language which performs a different computation or action depending on whether a programmer-specified condition evaluates to true or false. An example of a conditional statement is an 'if-then-else' construct. If the condition associated with the 'if' statement evaluates as true, then statements associated with the 'if' statement (e.g., line 204 in example software code 200) are evaluated. If the condition associated with the 'if' evaluates as false, then statements associated with the 'else' statement (e.g., line 206 in example software code 200) are evaluated. A person skilled in the relevant art will recognize that conditional statements can be expressed using other programming constructs and in other programming languages.

If the line of code is not a conditional statement, step 140 evaluates the program statement with the range of values defined in step 110. For instance, in referring to example software code 200, line 201 increments the range of values by '1'. That is, since 'c' has a range of values [−128 to 127], line 201 receives each value in the range and increments the value by T to generate a new range of values [−128 to 127] (note that if the range [−128 to 127] is incremented by '1', then the resulting range would be [−127 to 128]; however, the value '128' cannot be represented as a data type 'char' and as such, the range wraps around to provide a value of '−128' to provide the original range of [−128 to 127]). This range of values is then processed by the remaining lines of code.

Step 150 assesses whether a program misbehavior has occurred as a result of executing the program statement. An example of program misbehavior can be a memory access error in a system executing the software code or a program failure. Program misbehavior is an important debug feature for software developers and quality assurance engineers since information extracted from the misbehavior (e.g., code location of the misbehavior and program states generating the misbehavior) can be used in debugging the code. If program misbehavior has occurred, then step 155 raises a flag to indicate the misbehavior. An example of the flag used in step 155 can be an indicator that alerts a quality assurance engineer of the misbehavior.

After an indication of no program misbehavior in step 150 or a flag in step 155, method 100 proceeds to step 180. Step 180 assesses whether an end of a program has been reached. If so, then step 170 assesses whether a pending branch list is empty. The pending branch list relates to a feature of method 100 and will be described below with respect to step 170. If the pending branch list is empty, then step 190 indicates the end of the software code. If the end of the program has not been reached in step 180, then step 120 progresses to the next statement in the software code and if the next statement is a conditional statement (see step 130), then method 100 performs step 160.

Step 160 analyzes whether the conditional statement has been previously evaluated. If the conditional statement has not yet been evaluated (e.g., execution of the conditional statement by the analyzer tool for a first time), then method 100 proceeds to step 162.

In step 162, an alternate branch is placed in a pending branch list. As described above with respect to step 130, conditional statements can either evaluate to true or false, where the software code branches in one direction if the condition is true and in another direction if the condition is false. In an embodiment, step 162 can choose either to evaluate the conditional statement as true or as false. If the conditional statement is initially evaluated as true, then step 162 places an indicator in the pending branch list that the false condition has not been evaluated. In the alternative, step 162 can place an indicator in the pending branch list that the true condition has not been evaluated if the conditional statement is initially evaluated as false. In an embodiment, the pending branch list can be a repository that stores information on unexecuted branches for one or more conditional statements.

In an embodiment, step 162 also selects one or more values to evaluate the true and false scenarios of the conditional statement. An example of a method that can be used to select the one or more values to evaluate the conditional statement can be found in "Code Analysis via Ranged Memory Values" (U.S. patent application Ser. No. 12/254,406, filed Oct. 20, 2008, which is herein incorporated by reference in its entirety. For ease of explanation and for purposes of example, it will be assumed that the conditional 'if' statement in line 203 is evaluated as true. Based on this example, an indicator that the false condition has not been evaluated is placed in the pending branch list.

Step 164 stores checkpoint information on the program state for the conditional statement. In an embodiment, step 164 not only tracks one or more program states evaluated by the software code to reach the conditional statement, but step 164 also tracks one or more program states required to trigger an alternate branch in the conditional statement. In an embodiment, the program states applied to reach the conditional statement and to trigger the alternate branch can include one or more values from the range of values (defined in step 110) to evaluate the conditional statement as 'true' or 'false'. For instance, in line 203 of example software code 200, the conditional 'if' statement is initially evaluated as true in this example, where a range of values [10 to 20] satisfies the condition. Here, in storing checkpoint information on the program state for the conditional statement, step 164 can store information relating to one or more program states used to reach the conditional statement in the execution of the program, as well as one or more program states required to trigger a false scenario in the conditional statement. In an embodiment, this checkpoint information can be used by step 175 to restore the program state for the conditional statement so that the statement's alternate branch can be evaluated when the conditional statement is re-visited in step 130. Steps 170 and 175 are described further below. The storage of checkpoint information on program states is known to those persons skilled in the relevant art.

In an embodiment, after one branch of the conditional statement is evaluated in step 140, step 150 assesses whether a program misbehavior occurred as a result of an evaluation of the conditional statement. In referring to example software code 200, if the value of 'c' is '17' upon the execution of the 'if' statement in line 203, then step 150 can assess whether this would trigger a program misbehavior. In the case of example software code 200, if 'c' is '17' then this would not cause program misbehavior and, thus, the program would return a '1' in line 204. According to an embodiment, if a program misbehavior occurred, then a flag would be triggered in step 155. For example, if 'c' is '0' upon the execution of the statement in line 206, a program misbehavior would trigger a flag in step 155 because line 206 would result in dividing a term by zero.

After steps 150 and 155, step 180 assesses whether the end of the program has been reached. If not, then step 120 progresses to the next statement in the software code. If the end of the program has been reached in step 180, then step 170 assesses whether the pending branch list is empty. For a non-conditional statement, there are zero branches.

For a conditional statement with one of its branches already evaluated (see steps 160, 162, and 164), a 'NO' would result from the inquiry in step 170. As described above with respect to steps 162 and 164, in an embodiment, an alternate branch indicator is placed in a pending branch list and checkpoint information on the program state for the conditional statement is stored. Step 175 can use this information to restore the program state for the conditional statement so that the alternate branch can be evaluated. In referring to example software code 200, during the first pass of the conditional statement in line 203, the statement is, in an example, evaluated as true and an indicator that the false condition has not been explored is placed in the pending branch list along with checkpoint information for the program state required to trigger the false scenario (e.g., one or more values outside the range of [10 to 20]). Once the program state is restored based on this information, the false condition can be evaluated in step 140. After evaluation of the false condition, the entry for this alternate branch in the pending branch list is removed.

A person skilled in the art will recognize that software code can contain multiple conditional statements and the branch list can store checkpoint information on alternate branches for the multiple conditional statements such that these alternate branches can be evaluated, according to an embodiment of the present invention. Oftentimes, software programs contain nested conditional statements. A nested conditional statement is a conditional statement residing within another conditional statement. A person skilled in the relevant art will also recognize that nested conditional statements can be evaluated in a similar manner to that described above with respect to method 100.

After substantially all program statements in a software code have been evaluated applying the steps described above in method 100 and the branch list is empty (in step 170), then method 100 ends at step 190.

In sum, embodiments of the present invention can provide extensive code coverage since the embodiments explore a wide range of program states. In particular, embodiments of method 100 can analyze both branches of a conditional statement in software code. This feature of method 100 not only provides wide coverage for software code analysis but also generates minimal false positive errors and reduces the number of false negative errors. In an embodiment, method 100 generates zero false positive errors.

Figure 3:
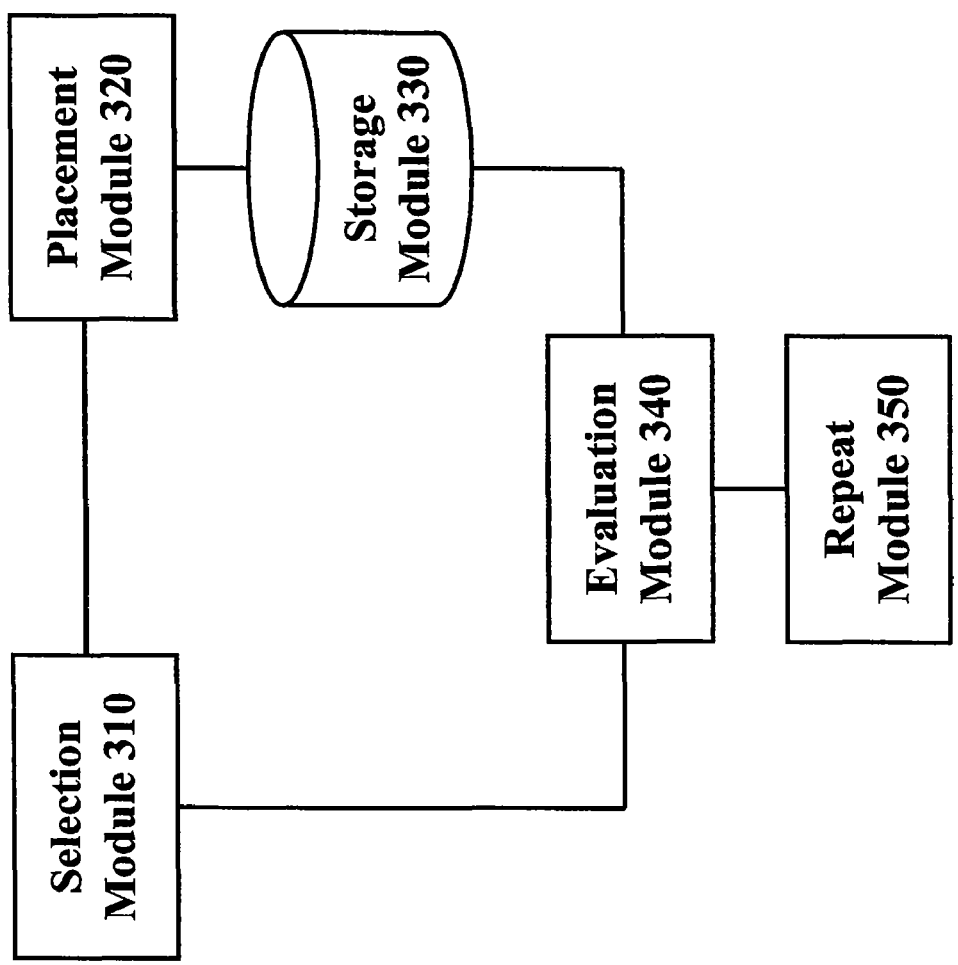
FIG. 3 is an illustration of an embodiment of a system configured to explore branches of a conditional statement in software code.

FIG. 3 is an illustration of an embodiment of a system 300 configured to explore branches of a conditional statement in software code. System 300 includes a selection module 310, a placement module 320, a storage module 330, an evaluation module 340, and a repeat module 350.

Selection module 310 is coupled to placement module 320 and evaluation module 340 as shown in FIG. 3. Selection module 310 can be configured to select a first branch of a conditional statement to be evaluated.

Placement module 320 is coupled to storage module 330. Placement module 320 can be configured to place a second branch of a conditional statement in a pending branch list. In an embodiment, placement module 320 can be configured to place an indicator in the pending branch list that either a true or a false condition has not been evaluated. Further, storage module 330 can be configured to store checkpoint information on a program state for the conditional statement associated with the second branch. In an embodiment, storage module 330 can be configured to track one or more program states evaluated by the software code to reach the conditional statement and one or more program states required to trigger the second branch.

In referring to FIG. 3, evaluation module 340 is coupled to selection module 310 and storage module 330. Evaluation module 340 can be configured to evaluate the second branch, based on the checkpoint information, after an evaluation of the first branch is performed. In an embodiment, evaluation module 340 can be configured to assess whether a program misbehavior occurred as a result of an evaluation of the first and second branches.

Repeat module 350 is coupled to evaluation module 340 as shown in FIG. 3. Repeat module 350 can be configured to repeat the functions performed by the selection, placement, storage, and evaluation modules (elements 310, 320, 330, and 340, respectively) for at least a first level of conditional statements in the software code. In an embodiment, repeat module 350 can be configured to assess whether the pending branch list is empty.

Figure 4:
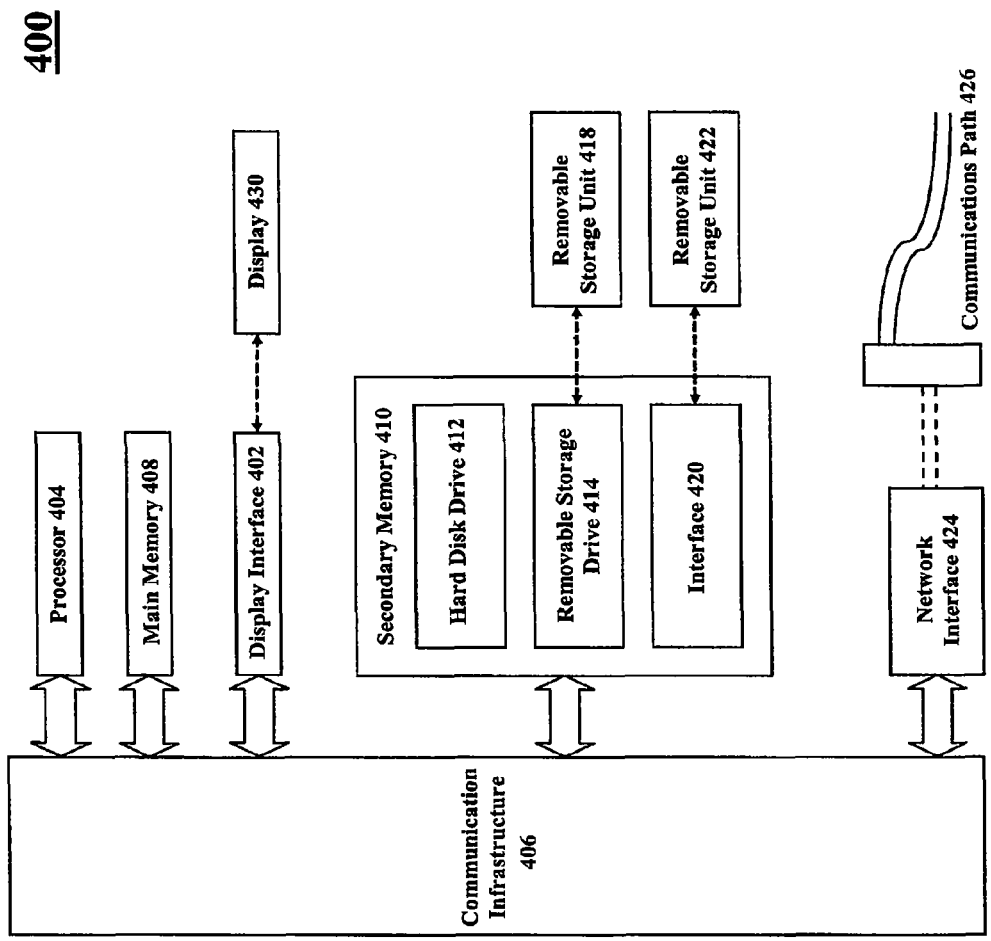
FIG. 4 is an illustration of an example computer system in which the present invention can be implemented.

Various aspects of the present invention may be implemented in software, firmware, hardware, or a combination thereof. FIG. 4 is an illustration of an example computer system 400 in which embodiments of the present invention, or portions thereof, can be implemented as computer-readable code. For example, the methods illustrated by flowchart 100 of FIG. 1 or system 300 of FIG. 3 can be implemented in system 400. Various embodiments of the invention are described in terms of this example computer system 400. After reading this description, it will become apparent to a person skilled in the relevant art how to implement embodiments of the invention using other computer systems and/or computer architectures.

Computer system 400 includes one or more processors, such as processor 404. Processor 404 may be a special purpose or a general purpose processor. Processor 404 is connected to a communication infrastructure 406 (e.g., a bus or network).

Computer system 400 also includes a main memory 408, preferably random access memory (RAM), and may also include a secondary memory 410. Secondary memory 410 can include, for example, a hard disk drive 412, a removable storage drive 414, and/or a memory stick. Removable storage drive 414 can include a floppy disk drive, a magnetic tape drive, an optical disk drive, a flash memory, or the like. The removable storage drive 414 reads from and/or writes to a removable storage unit 418 in a well known manner. Removable storage unit 418 can comprise a floppy disk, magnetic tape, optical disk, etc. which is read by and written to by removable storage drive 414. As will be appreciated by persons skilled in the relevant art, removable storage unit 418 includes a computer-usable storage medium having stored therein computer software and/or data.

In alternative implementations, secondary memory 410 can include other similar devices for allowing computer programs or other instructions to be loaded into computer system 400. Such devices can include, for example, a removable storage unit 422 and an interface 420. Examples of such devices can include a program cartridge and cartridge interface (such as those found in video game devices), a removable memory chip (e.g., EPROM or PROM) and associated socket, and other removable storage units 422 and interfaces 420 which allow software and data to be transferred from the removable storage unit 422 to computer system 400.

Computer system 400 can also include a communications interface 424. Communications interface 424 allows software and data to be transferred between computer system 400 and external devices. Communications interface 424 can include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 418, removable storage unit 422, and a hard disk installed in hard disk drive 412. Computer program medium and computer-usable medium can also refer to memories, such as main memory 408 and secondary memory 410, which can be memory semiconductors (e.g., DRAMs, etc.). These computer program products provide software to computer system 400.

Computer programs (also called computer control logic) are stored in main memory 408 and/or secondary memory 410. Computer programs may also be received via communications interface 424. Such computer programs, when executed, enable computer system 400 to implement embodiments of the present invention as discussed herein. In particular, the computer programs, when executed, enable processor 404 to implement processes of the present invention, such as the steps in the methods illustrated by flowchart 100 of FIG. 1, discussed above. Accordingly, such computer programs represent controllers of the computer system 400. Where embodiments of the invention are implemented using software, the software can be stored in a computer program product and loaded into computer system 400 using removable storage drive 414, interface 420, hard drive 412 or communications interface 424.

Embodiments of the invention are also directed to computer program products including software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method to explore branches of a conditional statement in software code, comprising:
    (a) selecting a first branch of the conditional statement in the software to evaluate;
    (b) placing a second branch of the conditional statement in a pending branch list, the pending branch list including information on unexecuted branches for one or more conditional statements, and placing an indicator in the pending branch list that either a true or a false condition of the conditional statement is unevaluated:
    (c) automatically generating a range of input values for input into the first and second branches;
    (d) storing checkpoint information on a program state for the conditional statement associated with the second branch, wherein the checkpoint information comprises at least one of one or more program states evaluated by the software code to reach the conditional stateroom and one or more program states required to trigger the second branch;
    (e) selecting an input value that triggers the second branch of the conditional statement from the range of input values; and
    (f) evaluating the second branch using the selected input value, based on the checkpoint information, after an evaluation of the first branch is performed.

2. The computer-implemented method of claim 1, further comprising:
    (g) repeating steps (a)-(f) for at least a first level of conditional statements in the software code.

3. The computer-implemented method of claim 1, wherein step (f) comprises assessing whether a program misbehavior occurred as a result of an evaluation of the first and second branches.

4. The computer-implemented method of claim 3, wherein assessing the program misbehavior comprises indicating at least one of a program failure and a memory access error in a computer system that evaluates the software code.

5. The computer-implemented method of claim 1, wherein step (f) comprises removing the second branch from the pending branch.

6. The compute-implemented method of claim 1, wherein step (t) comprises re-evaluating the conditional statement for a branch in the pending branch list.

7. The computer-implemented method of claim 2, wherein step (g) comprises assessing whether the pending branch list is empty.

8. The computer-implemented method of claim 2, wherein step (g) comprises repeating steps (a)-(f), for nested conditional statements in the software code.

9. A computer program product comprising a non-transitory computer-usable storage medium having computer program logic recorded thereon for enabling a processor to explore branches of a conditional statement in software code, the computer program logic comprising:
    first computer readable program code that enables a processor to select a first branch of the conditional statement in the software code to evaluate;
    second computer readable program code that enables a processor to place a second branch of the conditional statement in a pending branch list, the pending branch list including information on unexecuted branches for one or more conditional statements, the second computer readable program code enabling a processor to place an indicator in the pending branch list that either a true or false condition of the conditional statement is unevaluated;
    third computer readable program code that enables a processor to automatically generate a range of input values for input into the first and second branches;
    fourth computer readable program code that enables a processor to store checkpoint information on a program state for the conditional statement associated with the second branch, wherein the checkpoint information comprises at least one of one or more program states evaluated by the software code to reach the conditional statement and one or more program states required to trigger the second branch;
    fifth computer readable program code that enables a processor to select an input value that triggers the second branch of the conditional statement from the range of input values; and
    sixth computer readable program code that enables a processor to evaluate the second branch using the selected input value, based on the checkpoint information, after an evaluation of the first branch is performed.

10. The computer program product of claim 9, further comprising: seventh computer readable program code that enables a processor to repeat functions performed by the first, second, third, fourth, fifth, and sixth computer readable program code for at least a first level of conditional statements in the software code.

11. The computer program product of claim 10, wherein the seventh computer readable program code comprises:
eighth computer readable program code that enables a processor to assess whether the pending branch list is empty.

12. The computer program product of claim 9, wherein the sixth computer readable program code comprises:
seventh computer readable program code that enables a processor to assess whether a program misbehavior occurred as a result of an evaluation of the first and second branches.

13. The computer program product of claim 12, wherein the seventh computer readable program code comprises:
eighth computer readable program code that enables a processor to indicate at least one of a program failure and a memory access error in a computer system that evaluates the software code.

14. The computer program product of claim 9, wherein the sixth computer readable program code further comprises:
seventh computer readable program code that enables a processor to remove the second branch from the pending branch list.

15. The computer program product of claim 9, where the sixth computer readable program code comprises:
seventh computer readable program code that enables a processor to re-evaluate the conditional statement for a branch in the pending branch list.

16. A system configured to explore branches of a conditional statement in software code, comprising:
a selection module configured to select a first branch of the conditional statement to evaluate;
a placement module configured to place a second branch of the conditional statement in a pending branch list, the pending branch list including information on unexecuted branches for one or more conditional statements, the placement module placing an indicator in the pending branch list that either a true or false condition of the conditional statement is unevaluated;
an input module configured to automatically generate a range of input values for input into the first and second branches arid further configured to select art input value that triggers the second branch of the conditional statement from the range of input values;
a storage module configured to store checkpoint information on a program state for the conditional statement associated with the second branch, wherein the checkpoint information comprises a least one of one or more program states evaluated by the software code to reach the conditional statement and one or more program states required to trigger the second branch; and
an evaluation module configured to evaluate the second branch using the selected input value, based on the checkpoint information, after an evaluation of the first branch is performed, wherein each of the placement module, input module, storage module, and evaluation modules is implemented on a processing device.

17. The system of claim 16, further comprising:
a repeat module configured to repeat the functions performed by the selection, placement, input, storage, and evaluation modules for at least a first level of conditional statements in the software code.

18. The method of claim 1, wherein the software code is source code, and the checkpoint information comprises details on a location in the software code to resume the second branch of the conditional statement.

19. A computer-implemented method to explore branches of a conditional statement in software code, comprising:
(a) selecting a first branch of the conditional statement in the software code to evaluate;
(b) placing a second branch of the conditional statement in a pending branch list, the pending branch list including information on unexecuted branches for one or more conditional statements;
(c) automatically generating a range of input values for input into the first and second branches;
(d) storing checkpoint information on a program state for the conditional statement associated with the second branch, wherein the checkpoint information comprises at least one of one or more program states evaluated by the software code to reach the conditional statement and one or more program states required to trigger the second branch;
(e) selecting, an input value that triggers the second branch of the conditional statement from the range of input values; and
(f) evaluating the second branch using the selected input value, based on the checkpoint information, after an evaluation of the first branch is performed, and assessing whether a program misbehavior occurred as a result of an evaluation of the first and second branches by indicating at least one of a program failure and a memory access error in a computer system that evaluates the software code.

20. The computer-implemented method of claim 19 wherein step (f) further comprises removing the second branch from the pending branch list.

21. The computer-implemented method of claim 19 wherein step (f) further comprises re-evaluating the conditional statement for a branch in the pending branch list.

22. The computer-implemented method of claim 19, further comprising: (g) repeating steps (a)-(f) for at least a first level of conditional statements in the software code.

23. The computer-implemented method of claim 22, wherein step (g) comprises assessing whether the pending branch list is empty.

24. The computer-implemented method of claim 22, wherein step (g) comprises repeating steps (a)-(f) for nested conditional statements in the software code.

25. A computer program product comprising a non-transitory compute-usable storage medium having computer program logic recorded thereon for enabling a processor to explore branches of a conditional statement in software code, the computer program logic comprising:
first computer readable program code that enables a processor to select a first branch of the conditional statement in the software code to evaluate;
second computer readable program code that enables a processor to place a second branch of the conditional statement in a pending branch list, the pending branch list including information on unexecuted branches for one or more conditional statements;
third computer readable program code that enables a processor to automatically generate a range of input values for input into the first and second branches;
fourth computer readable program code that enables a processor to store checkpoint information on a program state for the conditional statement associated with the second branch, wherein the checkpoint information comprises at least one of one or more program states evaluated by the software code to reach the conditional statement and one or more program states required to trigger the second branch;

fifth computer readable program code that enables a processor to select an input value that triggers the second branch of the conditional statement from range of input values; and sixth computer readable program code that enables a processor to evaluate the second branch using the selected input, the sixth computer readable program code enabling a processor to assess whether a program misbehavior occurred as a result of an evaluation of the first and second branches and to indicate at least one of a program failure and a memory access error in a computer system that evaluates the software code.

26. The computer program product of claim 25, further comprising:

seventh computer readable program code that enables a processor to repeat functions performed by the first, second, third, fourth, fifth, and sixth computer readable program code for at least a first level of conditional statements in the software code.

27. The computer program product of claim 26, wherein the seventh computer readable program code comprises:

eighth computer readable program code that enables a processor to assess whether the pending branch list is empty.

28. The computer program product of claim 25, wherein the sixth computer readable program code further comprises:

seventh computer readable program code that enables a processor to remove the second branch from the pending branch list.

29. The computer program product of claim 25, where the sixth computer readable program code comprises:

seventh computer readable program code that enables a processor to re-evaluate the conditional statement for a branch in the pending branch list.

* * * * *

UNITED STATES PATENT AND TRADEMARK OFFICE
CERTIFICATE OF CORRECTION

PATENT NO. : 8,291,383 B1
APPLICATION NO. : 12/254419
DATED : October 16, 2012
INVENTOR(S) : Christian L. Evans It is certified that error appears in the above-identified patent and that said Letters Patent is hereby corrected as shown below:

At column 10, claim number 6, line number 20, which reads "The compute-implemented method of claim 19" should read -- The computer-implemented method of claim 19 --

At column 11, claim number 16, line number 45, which reads "branches arid further configured to select art input value" should read -- branches and further configured to select art input value --

Signed and Sealed this
Fifth Day of February, 2013

Teresa Stanek Rea
*Acting Director of the United States Patent and Trademark Office*